March 19, 1940.  M. A. EDWARDS ET AL  2,194,299
FREQUENCY COMPENSATOR
Filed May 27, 1939
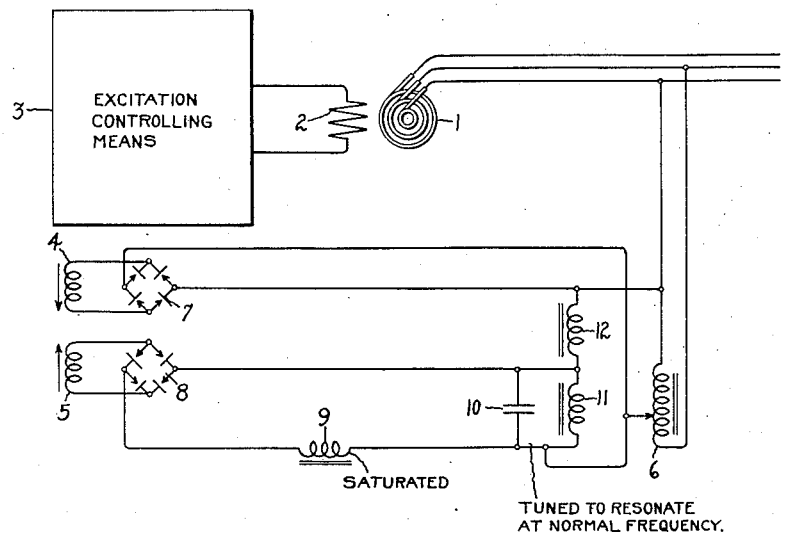
Inventors:
Martin A. Edwards,
Richard W. Porter,
by Harry E. Dunham
Their Attorney.

Patented Mar. 19, 1940

2,194,299

UNITED STATES PATENT OFFICE 2,194,299

FREQUENCY COMPENSATOR

Martin A. Edwards and Richard W. Porter, Schenectady, N. Y., assignors to General Electric Company, a corporation of New York Application May 27, 1939, Serial No. 276,211

4 Claims. (Cl. 171—119)

This invention relates to frequency compensators and more particularly to an arrangement for compensating the electro-responsive primary control circuit of a regulator of an alternating quantity whose frequency is subject to departures from a normal value for errors produced by said departures.

Many circuits which measure an alternating quantity, such for example as the voltage of an alternating current circuit, are reactive in character so that if the frequency of the measured quantity is variable the accompanying changes in the reactance of the measuring circuit produce errors in the response.

In accordance with our invention these errors are corrected or compensated for by the combination of a resonant circuit and a reactance. The resonant circuit is tuned to resonance at the normal frequency of the measured alternating quantity so that departures from the normal frequency produce dissonance. The current accompanying this condition of dissonance will be leading or lagging depending upon the direction in which the frequency has departed from normal. This reversible phase current when passed through the reactance produces a reversible voltage which is applied to the measuring circuit so as to compensate it for its change in reactance and thus compensate the measuring circuit for frequency errors.

An object of the invention is to provide a new and improved frequency compensator circuit.

Another object of the invention is to provide a novel and simple system for compensating a circuit which measures an alternating quantity for errors produced by variations in the frequency of said quantity.

Another object of the invention is to provide a novel and simple frequency compensator for alternating current voltage regulators.

The invention will be better understood from the following description taken in connection with the accompanying drawing and its scope will be pointed out in the appended claims.

Referring now to the single figure of the accompanying drawing, which illustrates diagrammatically an embodiment of our invention, we have shown therein an automatic voltage regulator system for a three-phase synchronous dynamo electric machine 1 having a field winding 2. The excitation of the field winding is controlled by any suitable excitation controlling means 3, such for example as a direct current exciter or counter E. M. F. machine. The excitation controlling means is controlled by a pair of opposed control windings 4 and 5 which are energized in accordance with the voltage of the alternator by means of an adjustable auto-transformer 6 for adjusting the level of the voltage held by the regulator system. Rectifiers 7 and 8 are provided for causing direct current to flow in each of the windings. A normally highly saturated reactor 9 is connected in the input circuit of the rectifier 8. This circuit may be considered the primary control circuit of the regulator.

At normal voltage the winding 4 predominates slightly over the winding 5 so that a net or resultant magnetizing effect of the two windings causes the excitation controlling means to provide sufficient excitation to maintain normal voltage. If the voltage increases the current in the winding 5 increases by a greater percentage than the current in the winding 4 due to the saturated condition of the reactor 9. This increases the net or resultant ampere turns of the two coils and causes the excitation controlling means to reduce the excitation and consequently the voltage of the main machine. Conversely, upon a decrease in regulated voltage the current in the primary winding 5 decreases by a greater percentage than the current in the winding 4, thereby decreasing the net ampere turns of the two control windings and causing an increase in the excitation and voltage of the main machine. Windings 4 and 5 may be field windings on an exciter or they may be operating windings on the solenoid core of a regulator for the excitation of an exciter.

If the speed of alternator 1 changes, its frequency changes and as the reactance of reactor 9 is sensitive to variations in frequency the current in the control winding 5 will vary with variations in frequency and thus will cause a frequency error.

This is compensated for by energizing the winding 5 from across a parallel resonant circuit comprising a capacitor 10 and a reactor 11. This parallel resonant circuit is connected in series with a second reactor 12 across the output terminals of the transformer 6, that is to say, it is connected in parallel with the input terminals of the rectifier 7 supplying the control winding 4.

The resonant circuit is tuned to resonate at the normal frequency of the alternator 1. Consequently, at normal frequency substantially no current flows through the parallel resonant circuit and its impedance is substantially infinite. Therefore, substantially all of the voltage applied to the series circuit containing the resonant circuit and the reactor 12 appears across the resonant circuit so that the voltage applied to the input terminals of the rectifiers 7 and 8 is the same.

If now the frequency decreases the reactance of the capacitor 10 increases and the reactance of the reactor 11 decreases. This causes a lagging current to be drawn through the reactor 12, thus producing a voltage drop, that is to say, a voltage which subtracts from the voltage applied to the parallel resonant circuit and consequently subtracts from the voltage which is applied to the primary control circuit. As the effect of the decrease in frequency is also to decrease the reactance of reactor 9 and consequently to increase the current in the winding 5, the effect of the voltage drop produced in the reactor 12 tends to offset the change in the reactance of the reactor 9, and by properly proportioning the elements substantially exact compensation can be secured for a reasonable decrease in frequency. In this manner the current in the winding 5 will be substantially independent of decreases in frequency.

In a similar manner if the frequency increases the reactance of capacitor 10 decreases and the reactance of reactor 11 increases, thus causing a leading current to flow through the reactor 12. This leading current in the reactor causes a voltage rise or increase to be applied to the primary control circuit which compensates this circuit for the decrease in current caused by the normal increase in reactance of the reactor 9 with increases in frequency.

It will thus be seen that the reversible phase current produced by dissonance in the parallel resonant circuit causes a reversible voltage to be produced in the reactor 12 which substantially exactly compensates the primary control circuit for the changes in impedance of the reactor 9 with changes in frequency.

While the invention has been described in connection with a regulator control circuit having two windings, it will of course be obvious to those skilled in the art that it may also be applied to control circuits or measuring circuits generally having any number of windings.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. A frequency compensator for an automatic alternating voltage regulator of the type having a relatively highly inductive primary control circuit comprising, in combination, a pair of serially connected reactors connected to respond to the regulated alternating voltage, a capacitor, said control circuit and said capacitor being connected across one of said reactors, said capacitor and the reactor it is connected across being so proportioned as to resonate at a predetermined normal frequency of said regulated alternating voltage, the other reactor being so proportioned that the variations in voltage across it caused by a dissonance current flow through said normally resonant capacitor and reactor when the frequency of the regulated voltage departs from normal substantially compensates said control circuit for the effect of changes in its inductive reactance resulting from said frequency departures from normal, whereby said primary voltage responsive control circuit is substantially independent of reasonable frequency variations.

2. In a regulator system for the magnitude of an alternating electrical quantity whose frequency is subject to variations from a normal value, a parallel resonant circuit adjusted to resonate at said normal frequency, an inductive regulator control circuit connected across said resonant circuit, and a reactor connected in series with said resonant circuit so that the two are energized by said quantity, said reactor being so proportioned with respect to said resonant circuit and the inductance of said control circuit that the changes in voltage across it with changes in frequency caused by a dissonance current through said resonant circuit when the frequency departs from normal substantially compensates said control circuit for the changes in its impedance caused by said frequency departures.

3. A frequency compensated electro-responsive system responsive to the magnitude of an electrical quantity comprising, in combination, a reactive primary electro-responsive circuit connected to be energized in accordance with the value of said quantity, the reactance of said circuit causing an error in the action of said system when said frequency departs from normal, a resonant circuit connected to respond to the frequency of said quantity and proportioned to resonate at said normal frequency, and means responsive to a dissonance condition of said resonant circuit when said frequency departs from normal for applying a compensating quantity to said control circuit so as to correct said error.

4. In a regulator system for an alternating voltage whose frequency varies from a normal value comprising, in combination, apparatus for controlling the magnitude of said voltage, a pair of opposed control coils for controlling said apparatus, one of said control coils being energized in direct proportion to said voltage, a parallel resonant circuit, a reactor, said resonant circuit and said reactor being connected in series with each other so as to be energized in accordance with the magnitude of said voltage, the other control coil being connected across said parallel resonant circuit, and a normally saturated reactor connected in series with said last mentioned control coil, said resonant circuit being tuned to resonate at the normal frequency of said voltage.

MARTIN A. EDWARDS.
RICHARD W. PORTER.